United States Patent
Viswanath et al.

(10) Patent No.: US 7,350,698 B2
(45) Date of Patent: Apr. 1, 2008

(54) LINE ITEM APPROVAL PROCESSING IN AN ELECTRONIC PURCHASING SYSTEM AND METHOD

(75) Inventors: Sridatta Viswanath, Santa Clara, CA (US); Robert J. Ruyak, San Francisco, CA (US); Samaresh Panda, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 995 days.

(21) Appl. No.: 10/099,697

(22) Filed: Mar. 15, 2002

(65) Prior Publication Data

US 2003/0177070 A1    Sep. 18, 2003

(51) Int. Cl.
*G06F 7/00* (2006.01)

(52) U.S. Cl. .................. 235/376; 235/383; 235/385; 705/26; 705/28

(58) Field of Classification Search .......... 235/376, 235/383, 385; 705/26, 28
See application file for complete search history.

(56) References Cited

U.S. PATENT DOCUMENTS

| | | | |
|---|---|---|---|
| 4,951,196 A | | 8/1990 | Jackson |
| 5,361,199 A | | 11/1994 | Shoquist et al. |
| 5,557,780 A | | 9/1996 | Edwards et al. |
| 5,694,551 A | * | 12/1997 | Doyle et al. ............. 705/26 |
| 5,758,327 A | * | 5/1998 | Gardner et al. .......... 705/26 |
| 6,023,683 A | | 2/2000 | Johnson et al. |
| 6,044,362 A | * | 3/2000 | Neely ....................... 705/34 |
| 6,055,516 A | * | 4/2000 | Johnson et al. .......... 705/27 |
| 6,065,120 A | | 5/2000 | Laursen et al. |
| 6,125,391 A | | 9/2000 | Meltzer et al. |
| 6,199,050 B1 | * | 3/2001 | Alaia et al. ............... 705/37 |
| 6,351,745 B1 | * | 2/2002 | Itakura et al. ........... 707/10 |
| 6,360,254 B1 | * | 3/2002 | Linden et al. ........... 709/219 |
| 6,571,218 B1 | * | 5/2003 | Sadler ...................... 705/16 |
| 6,609,108 B1 | | 8/2003 | Pulliam et al. |
| 6,658,483 B1 | | 12/2003 | Iwamoto et al. |
| 6,876,977 B1 | * | 4/2005 | Marks ....................... 705/26 |

(Continued)

OTHER PUBLICATIONS

Jeetu Patel, et al., "More Options for Electronic Filing," InformationWeek, Manhasset: Nov. 29, 2999, Issue 763, 5 pages.

(Continued)

*Primary Examiner*—Andrew Joseph Rudy
(74) *Attorney, Agent, or Firm*—Robert C. Kowert; Meyertons, Hood, Kivlin, Kowert & Goetzel, P.C.

(57) ABSTRACT

In an electronic purchasing system, a line item approval processing method and system. The line item approval system includes logic for approving a purchase requisition having a plurality of itemized goods and service and requiring approval by a plurality of authorized approvers on a line item by line item basis. In one embodiment of the present invention, an approval matrix defining identified authorized approver and conditions under which the authorized approvers must approve specified line items in a particular purchase requisition is generated by the line item approval system to enable approvers of the purchase requisition to monitor the status of the particular purchase requisition. The line item approval system allows a purchase order to be generated corresponding to a purchase requisition based on a partial approval of line items specified in a purchase requisition while some items are not approved.

31 Claims, 11 Drawing Sheets

U.S. PATENT DOCUMENTS

| | | | |
|---|---|---|---|
| 6,882,983 B2* | 4/2005 | Furphy et al. | 705/30 |
| 6,910,018 B1* | 6/2005 | Okada et al. | 705/26 |
| 6,931,420 B1* | 8/2005 | Silvester et al. | 707/202 |
| 2001/0037254 A1 | 11/2001 | Glikman | |
| 2001/0047311 A1 | 11/2001 | Singh | |
| 2002/0010638 A1* | 1/2002 | Fischer | 705/26 |
| 2002/0023045 A1 | 2/2002 | Feilbogen et al. | |
| 2002/0042779 A1* | 4/2002 | Osaka et al. | 705/51 |
| 2002/0062240 A1* | 5/2002 | Morinville | 705/8 |
| 2002/0065693 A1 | 5/2002 | Hattori et al. | |
| 2002/0069157 A1 | 6/2002 | Jordan | |
| 2002/0087419 A1 | 7/2002 | Andersson et al. | |
| 2002/0091533 A1 | 7/2002 | Ims et al. | |
| 2002/0107699 A1 | 8/2002 | Rivera et al. | |
| 2002/0116205 A1 | 8/2002 | Ankireddipally et al. | |
| 2002/0133569 A1 | 9/2002 | Huang et al. | |
| 2002/0156687 A1 | 10/2002 | Carr et al. | |
| 2002/0174000 A1 | 11/2002 | Katz et al. | |
| 2002/0184070 A1 | 12/2002 | Chen et al. | |
| 2002/0184123 A1* | 12/2002 | Sijacic et al. | 705/34 |
| 2002/0184145 A1 | 12/2002 | Sijacic et al. | |
| 2002/0188524 A1 | 12/2002 | Shimizu | |
| 2003/0002526 A1 | 1/2003 | Dias et al. | |
| 2003/0061121 A1 | 3/2003 | Ouchi | |
| 2003/0074269 A1 | 4/2003 | Viswanath | |
| 2003/0110114 A1* | 6/2003 | Dmochowski et al. | 705/36 |
| 2003/0139975 A1 | 7/2003 | Perkowski | |

OTHER PUBLICATIONS

"Netscape Announces Availability of Netscape BuyerXpert 2.0 for Corporate Procurement," AZ, Nov. 17, 1998, 3 pages.

* cited by examiner

MY INBOX (REQUISITIONS)

| REQUISITION | OWNER | TOTAL | LAST MODIFIED | NOTES REMARKS |
|---|---|---|---|---|
| 1138 REQ-1138 | BUGS BUNNY 1 HARE | 52087 | WED MAY 09022400 GMT 200 | NOTES |

| ITEM | QUANTITY | BASE (USD) | TOTAL (USD) |
|---|---|---|---|
| ☑ BOOKCASE 36 X 48/3 SHLF | 10 | 407.00 | 356.36 |
| ☐ DESK DBL RED 60 X 30 M | 20 | 1,252.00 | 1,062.30 |

810

[APPROVE 830] [APPROVE ALL 835]

LINE ITEM APPROVAL PROCESSING IN AN ELECTRONIC PURCHASING SYSTEM AND METHOD

FIELD OF THE INVENTION

The present claimed invention relates generally to the field of electronic procurement systems. More particularly, the present claimed invention relates to a line item approval system for purchase requests in an electronic purchasing and procurement environment.

BACKGROUND ART

The Internet has become the dominant vehicle for data communications with a vast collection of computing resources, interconnected as a network from sites around the world. And with the growth of Internet usage has come a corresponding growth in the usage of Internet device, wireless devices and services in a way different from the traditional uses of such devices.

The growing base of Internet users has become accustomed to readily accessing Internet-based services, which traditionally were restricted or limited to the "client/server" environment, at any time from any location. Accessibility to traditional business services and products over the Internet means enterprises have to adjust to new paradigms of transacting business.

Consequently, some organizations are, for example, implementing e-commerce and customer relationship management (CRM) strategies to increase revenue and bring them closer to their customer base. But organizations that are committed to an e-business strategy realize that their procurement operations are an equally critical aspect of their business. By implementing a sound e-procurement solution, organizations can truly integrate with their supply chain partners and realize dramatic business efficiencies and cost savings in purchasing everything from office supplies to services and raw materials.

For any organization, procuring goods and services is a core business function that is critical to successful operations of the company. All organizations must procure "indirect" goods such as office supplies and other materials that support business operations and enable maintenance and repair operations (MROs) to function.

In addition, many organizations must also procure "direct" goods, such as raw materials or components that are used in manufacturing processes. Other goods or services that organizations must procure include travel, consulting services and equipment.

Many large organizations have dedicated resources that handle procurement at a corporate level. By centralizing procurement, organizations can bring control over the entire process and improve their purchasing efficiencies. Unfortunately, in many organizations, procurement is still a fragmented, paper-intensive process that involves many forms, phone calls, and approval cycles. Just as procurement requires interfacing with multiple suppliers, it requires interacting with different areas of the organization (e.g., accounting, management, lines of business, receiving, etc.) each of which may have different processes and approval flows.

As organizations begin to embrace e-business technologies for selling goods and serving their customers online, they are also beginning to look at the efficiencies that e-commerce technologies can bring their internal procurement operations. Thus, e-procurement is quickly assuming a highly strategic role within the e-business strategies of many organizations.

With e-procurement, organizations can move the entire purchasing catalogs into a central catalog of products from approved suppliers, helping buyers quickly locate goods and services. E-procurement helps automate the formerly time consuming review process typically required to approve requisitions and initiate purchases. Finally e-procurement helps the organization realize efficiencies by accelerating the purchasing process, identifying existing inventory to minimize redundant purchasing, detecting unauthorized spending, determining purchasing patterns for improved budgeting, and ensuring contract compliance.

As the number of business applications on the Internet increases, having restricted content and very limited information about goods and services transactions over the Internet impairs the ability of purchasing professionals to take advantage of Internet technologies and provide efficient and cost effective services.

Figure 1A:
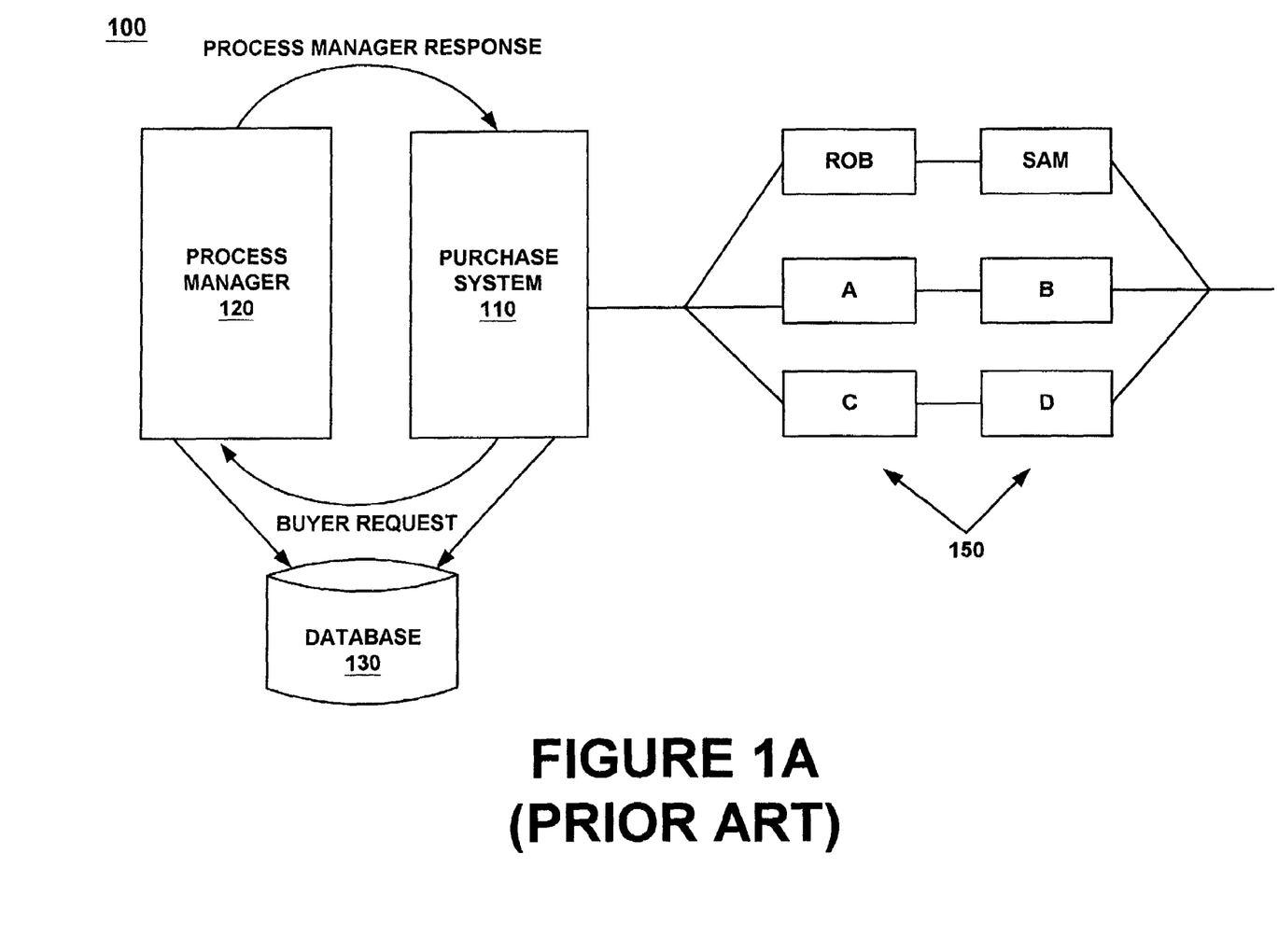
FIG. 1A is a block diagram of a prior art electronic purchasing system.

Some organizations have implemented on-line purchasing requisition systems that allow groups and individuals within a group to participate in the approval of purchase requisitions made to suppliers. FIG. 1A illustrates a prior art electronic purchasing environment. In the example shown in FIG. 1A, a purchase request is typically approved by the approval group 150. In the particular example, before a purchase order can be sent to a supplier, all the individuals e.g., A-D identified in the purchase requisition as having approval authority must execute the purchase requisition before the requisition can be transformed into a purchase order. This type of approval process is typically referred to as the requisition level approval.

Figure 1B:
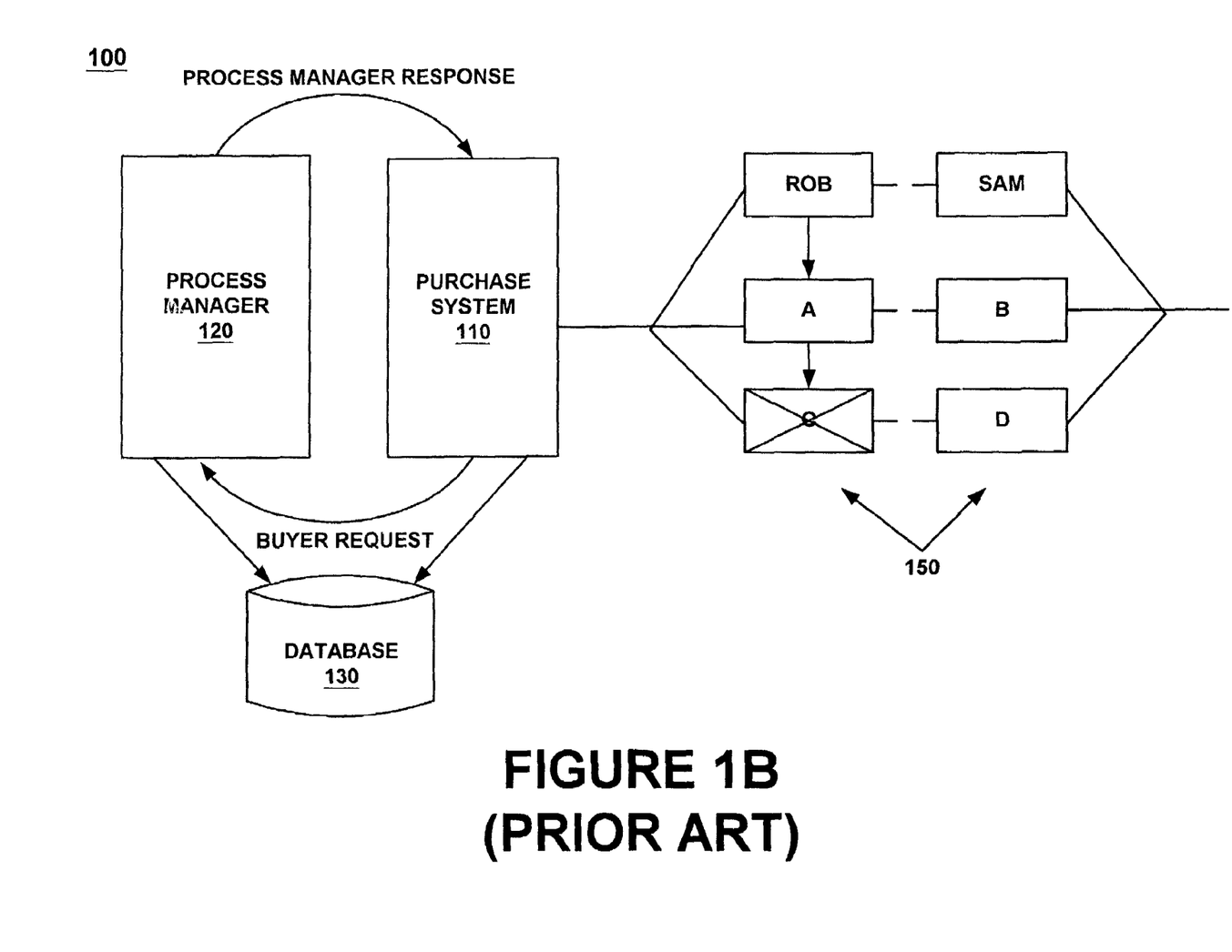
FIG. 1B is a block diagram of a prior art electronic purchasing system having a requisition level approval process.

In the purchasing environment shown in FIG. 1A, a refusal by one of the identified approvers (e.g., A-D) to approve a line item in the purchase requisition would lead to a total rejection of the purchase requisition (FIG. 1B). An individual approver may decline approval of a specific line item in a purchase requisition for a variety of reasons, among which may include the lack of authority to sign off on a dollar value of a line item, not having enough information on a particular line item, etc. In the requisition level approval depicted in FIGS. 1A and 1B, purchase requisition approval can be inefficient, limiting and time consuming and require multiple approval iterations before the requisition is converted into a purchase order.

SUMMARY OF INVENTION

Accordingly, to take advantage of the myriad of e-commerce applications being developed, an e-purchasing system is needed that has extensibility capabilities to allow user requests from purchasing requisitioners to the e-purchasing system to be approved into a purchase order based on a line item based approval scheme. Further, a need exists for "out-of-the-box" solutions to allow technically unsophisticated end-users to connect to the Internet and perform sophisticated purchasing and procurement decisions and activities not available in the prior art in an organization's purchasing environment. A need further exists for an improved and less costly device independent system, which improves efficiency and provides electronic requisition services to various users of different configurations without losing the embedded features designed for these devices.

What is described is an e-purchasing system having a portal server supporting a robust purchasing and procurement system providing a wide range of features that purchasing and procurement applications require including storing capabilities for various purchasing and procurement functions in a business environment. In one embodiment of the present invention, the procurement system includes a catalog management system that integrates information from multiple external catalogs into a consolidated catalog of goods and services from approved suppliers to enable a purchasing or procurement agent to purchase items over the Internet.

In one embodiment of the present invention, the purchasing processing system includes a requisition and order management module that helps organizations streamline the requisitions process in the organization. The requisition and order management module allows users to request multiple items from different suppliers or a single requisition from a plurality of back-end resource servers on the Internet and transforms the content into a format suitable for delivery to the purchasing requisitioner.

Embodiments of the present invention further include a line item approval system that allows multiple approvers to sign a purchase requisition by approving only line items associated with each approver in the process of generating a purchase order. The line item approving system allows the e-purchasing system of the present invention to automatically process purchasing requests regardless of whether all the lines of any itemized list of goods being requisitioned are individually approved by identified approvers of the requisition.

More specifically, embodiments of the present invention are directed to a system and a method for accepting in-bound order requests with a matrix of approvers with each approver authorized to approve the purchasing of one or more line itemized goods or services. The line item approval system of the present invention allows an approver to approve the purchase requisition by either approving items in the purchase requisition on a line-by-line basis or by a blanket approval at the requisition level.

Having an approver approve the purchase requisition on a line-by-line basis allows the electronic purchasing system of the present invention to generate a purchase order based on a partially approved purchase requisition or to decline the purchase of items in the purchase requisition based on the same approval process. In general, embodiments of the present invention vary the degree of approving supplier or buyer requests in a plurality of purchase orders or requisitions from a plurality of web-based order catalogs in the electronic procurement environment.

Embodiments of the invention also include a process manager system that tracks all the approvals executed by the electronic purchasing system of the present invention. The process manager communicates with the line item approval system to track and notify approvers in the approval matrix of the status of a purchase requisition submitted to the electronic purchasing system. The process manager further generates an approval graph of identified approvers for approving a particular requisition. The approval graph allows the identified approvers to check on the detailed approval information of each approver on the particular requisition.

Embodiments of the present invention include an electronic mailing system that helps to notify the identified approver of a particular requisition of the presence of the requisition in the approver's email in-box. From the in-box, the approver is able to automatically approve or decline the line items they are responsible for in the requisition.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrates embodiments of the invention and, together with the description, serve to explain the principles of the invention.

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments.

On the contrary, the invention is intended to cover alternatives, modifications and equivalents, which may be included within the spirit and scope of the invention as defined by the appended Claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

The invention is directed to a system, an architecture, subsystem and method to manage purchase requisition approvals in a e-commerce procurement and purchasing environment in a way superior to the prior art. In accordance with an aspect of the invention, an e-procurement and e-purchasing system provides users with a line item approval process of order requisitions electronically processed on the Internet.

Numerous specific details are not set forth in order to provide a thorough understanding of the present invention. However, it will be recognized by one skilled in the art that the present invention may be practiced without these specific details or with equivalents thereof.

Figure 2:
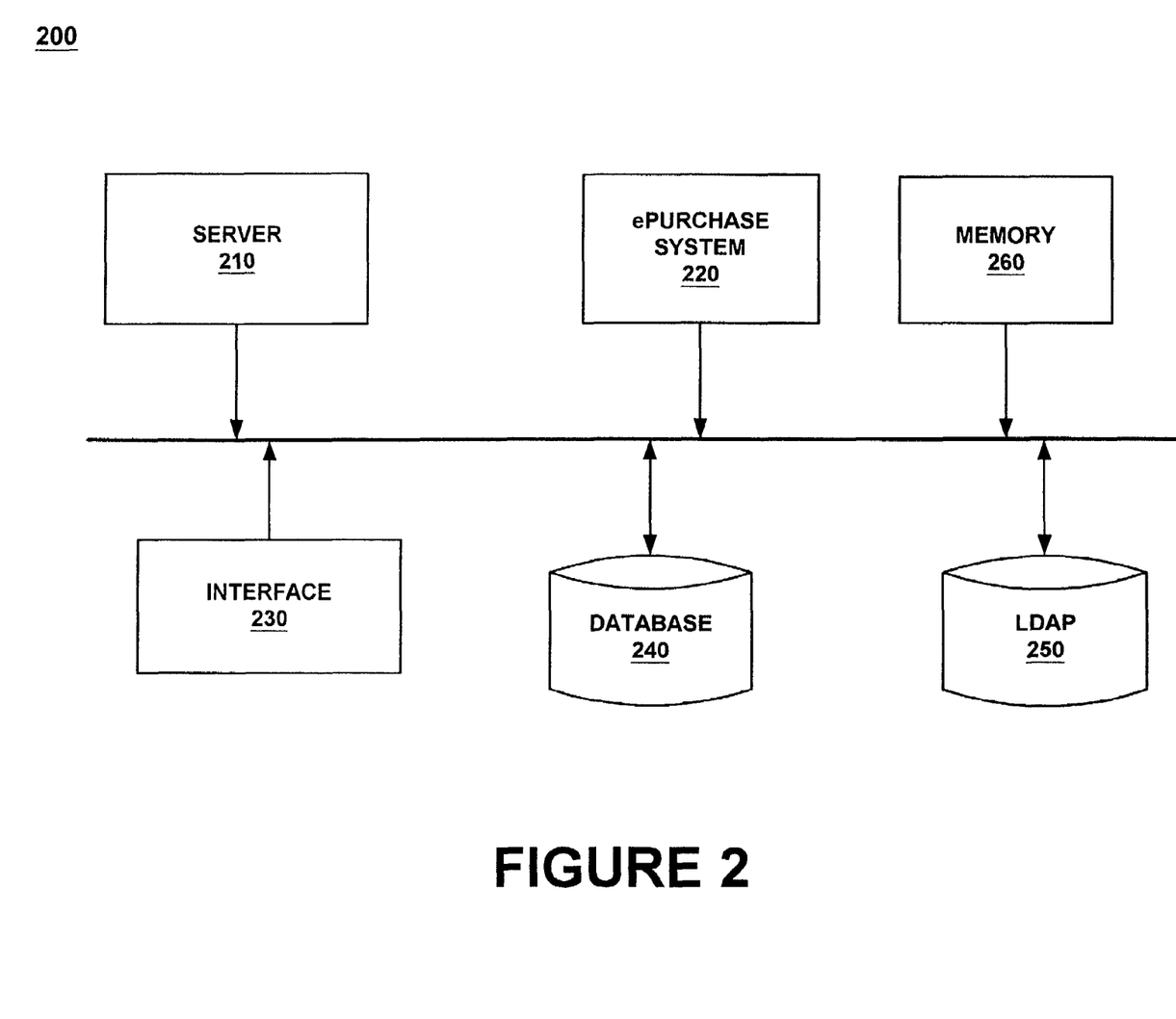
FIG. 2 is a block diagram of one embodiment of the electronic purchasing system of the present invention having a line-by-line requisition approval process.

FIG. 2 depicts an e-commerce procurement and purchasing environment of one embodiment of the present invention. The on-line purchasing and procurement environment 200 shown in FIG. 2 comprises computer server 210, e-purchase system 220, Interface 230, Database 240, Directory 250 and Memory 260 coupled a common communication channel.

Server 210 is coupled to provide an e-platform application server for the e-purchasing environment of the present invention. Server 210 provides a user with a single sign-on facility to the e-purchasing system 220 of the present invention, as well as the ability to customize the e-purchasing system 220. Server 210 also provides scalability and high availability to the user.

The e-purchasing system 220 is coupled to server 210 to provide an online centralized control for buying goods and services for enterprise operations. The e-purchasing system 220 further provides a business-to-business application for purchasing and procurement professionals within an organization in the enterprise. The e-purchasing system 220 is extensible to allow non-professional purchasing and procurement persons within the enterprise to purchase consumables such as office supplies, small office equipment and services from suppliers on the Internet.

Still referring to FIG. 2, Interface 230 couples to e-purchasing system 220 to provide a foundation for order submissions, and the communication between a customer and legacy systems and the e-purchasing system 220 of the present invention.

Interface 230 further supports secure transmission of data over public and private networks, as well as the storage of documents, tracking of services and the management of tasks. In one embodiment of the present invention, Interface 230 supports the American National Standards Institute (ANSI) ASCII 12 and other communication interface standards. Interface 230 further supports the use of tools for mapping, translation and conversion of any file format such as Electronic Data Interface (EDI) to a different file format.

Database 240 is coupled to the e-purchasing system 220 to provide ordering and catalog information to the user. Database 240 may be an "off-the-shelf" software product such as an Oracle database software developed and sold by Oracle corporation of Redwood City, Calif. In the present invention, data is stored in database 240 in the form of data objects with associating data attributes.

In the e-purchasing system 220 of the present invention, database 240 provides an intermediary storage facility of catalog information where orders originated by a user are stored. In-bound orders are processed by e-purchasing system 220 using order information retrieved from the catalogs stored in database 240. The e-purchasing system 220 transmits out-bound order documents based on available catalog information from a supplier to the buyer.

Directory 250 ("LDAP") is coupled to the e-purchasing system 220 to store membership information of users of the e-purchasing system 220. Directory 250 also stores information on the suppliers, as well as location information of buyers and sellers in order to facilitate an effective and efficient communication of order and supply information between enterprises.

Memory 260 is coupled to the server 210 to store transient copies of purchase requisitions stored in database 240. A purchase order requisition of catalog information stored in memory 260 has a one-to-one correlation with data objects stored in database 240. Information stored in memory 260 are stored as data objects or the like in a manner well known in the art.

Figure 3:
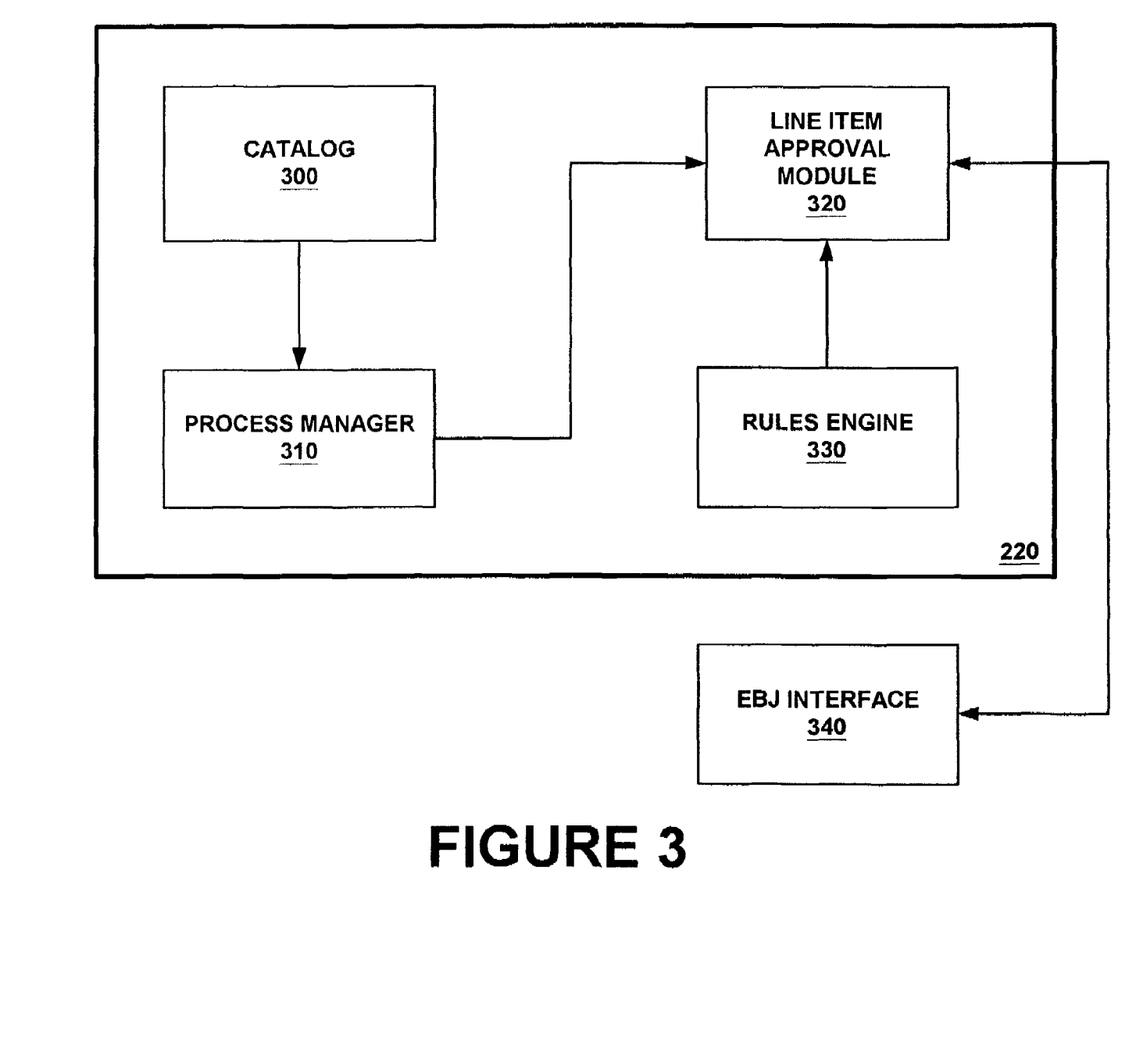
FIG. 3 is a block diagram of an embodiment of the architecture of the electronic purchasing system of one embodiment of the present invention.

Referring now to FIG. 3, a block diagram of one embodiment of the e-purchasing system 220 of the present invention is shown. As shown in FIG. 3, e-purchasing system 220 comprises catalog managing module 300, catalog process manager module 310, line item approval processing (LIAP) module 320 and rule engine module 330. Also shown in FIG. 3 is EBJ interface module 340 which is coupled to LIAP 320.

To make products available to buyers, suppliers organize product information into catalogs. The product information structure in a catalog is a hierarchy of categories with items under these categories. The ways of representing this information vary from supplier to supplier, even among suppliers of similar products.

Catalog management module 300 allows suppliers to map their existing catalogs to the e-purchasing system 220 using a set of graphical interface tools. Catalog management module 300 allows for quick real-time catalog creation and maintenance by providing the creation of buyer managed content.

Catalog management module 300 further enables a system administrator of the e-purchasing system 220 to create and maintain a standardized structure that maps supplier catalog data to an e-procurement and purchasing environment. Catalog management module 300 also provides the system administrator with the environment to create and manage catalogs of group-specific buyers and suppliers and generates requisitions and purchase products.

Process manager module 310 is coupled to catalog management module 300 and the line item approval module 320 to enable end-users to create web-based applications that define the different tasks in the approval of purchase requisitions, specifying who should perform them and mapping out how the process flows from one approver to another. The process manager module 310 includes a timer that processes an approver's approval of line items in a purchase requisition.

The process manager module 310 queries approvers identified in a purchase requisition to track the status of the approval process with respect to each purchase requisition processed by the e-purchasing system 220. The process manager module 310 further verifies that specified approval requirements and policies set forth in the e-purchasing system 220 have been met.

LIAP 320 is coupled to catalog management module 300 to provide a framework for automatically processing line item approvals by identified approvers within an organization for line items in a purchasing requisition. LIAP 320 provides supply requisitioners the flexibility of having requisitions totally or partially approved by a group of identified approvers in the electronic purchase process. LIAP 320 also provides users the ability to interactively track the requisitions approving process by scanning a series of computer screens and user in-boxes to identify those line items in a particular requisition that have been approved or declined.

An approver of the present invention is any individual user who authorizes an existing requisition to become a purchase order. An approver can be one of a group of approvers, can be mandatory or optional approver, and can delegate approval authority to another. A color coding scheme provided by the LIAP 320 also allows the approver to track those line items in a particular requisition that the approver approves or declines.

Still referring to FIG. 3, rules module 330 is coupled to LIAP 320 to provide the underlying business rules that control the operating transaction principles of the e-purchasing system 320. In the present invention, rules module 330 is configurable with generalized statements that allow system administrators to control the flow and behavior of e-purchasing system 220. The underlying business rules semantics are not as complex as a full programming language and therefore allow the user to perform typical customizations such as page layouts, icon layouts and other "click and surf" functions typical in Internet computing without requiring any programming experience.

Figure 4:
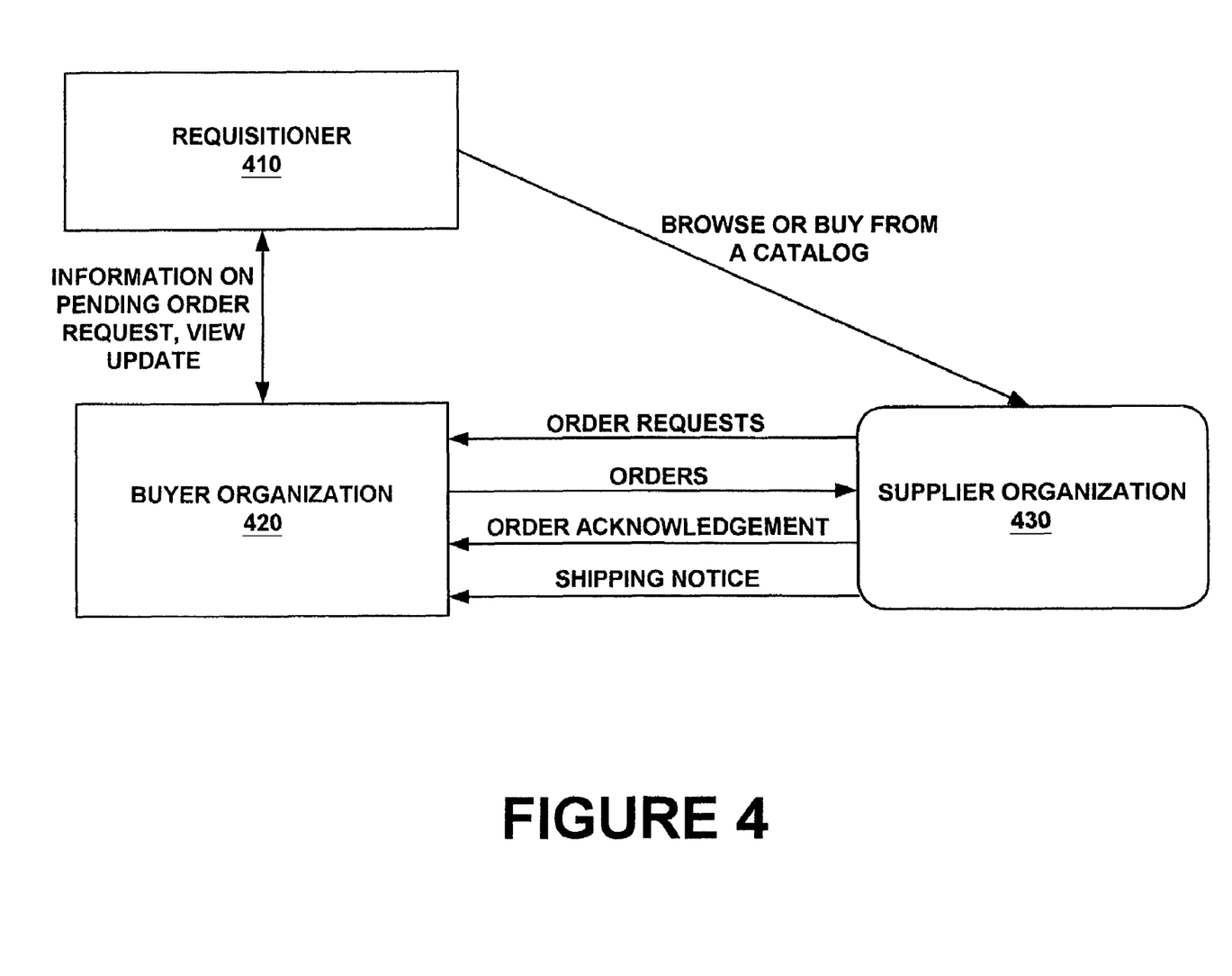
FIG. 4 is a block diagram of an exemplary process flow implementation of a purchase requisition of an embodiment of the present invention.

FIG. 4 is a block diagram depiction of an exemplary data flow of the Open Buying on the Internet (OBI) standard which is the underlying standard utilized in Interface 230. The data flow shown in FIG. 4 illustrates the interaction of these entities: requisition 410, Buying 420 and Supplier 430.

Requisition 410 represents the user with a need for a product or service, who meets this need by querying the supplier 430 catalogs for the required items. The requisition 410 generates order requests and querying order status to the e-purchase system 220 using an Internet browser.

Buyer 420 represents a purchasing management and information system which supports purchasing and procurement within an enterprise. These systems include an OBI server for receiving OBI order requests and retrieving OBI orders. The system further processes requisition profile information, trade partner information and other information necessary to complete an order. The buyer 420 also negotiates and maintains a contractual relationship with the supplier 430.

Supplier 430 maintains a dynamic electronic catalog that represents accurate product and price information that can be tailored based on the organization's affiliation of the requisitioner 410. Product and price information reflects the contract with a buyer. The supplier's catalog must be integrated effectively with the inventory and order management system and an OBI server for sending OBI order requests and receiving OBI orders.

Figure 5:
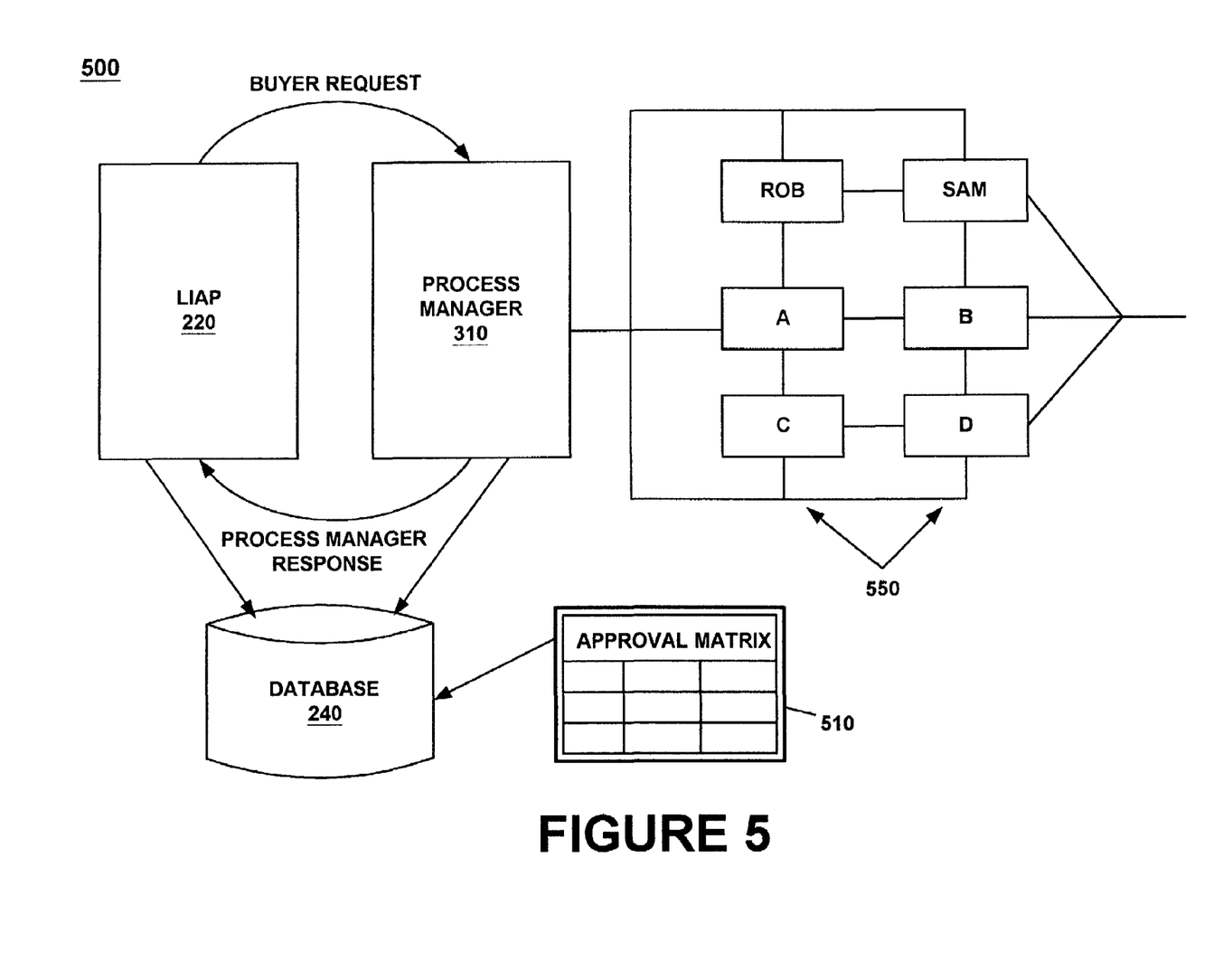
FIG. 5 is a block diagram of an exemplary purchasing environment of one embodiment of the present invention.

FIG. 5 is a block diagram illustration of an exemplary line item approval processing environment of one embodiment of the e-purchasing system 220 of the present invention. As shown in FIG. 5, the line item approval processing environment comprises purchasing system 220, process manager 310, an exemplary approver matrix 510, an exemplary approval graph matrix 550 and database 240.

The LIAP 320 processes line item approvals of the present invention. The LIAP 320 handles the processing of purchase requisitions through a series of approval steps until the requisition is approved and becomes a purchase order. The LIAP 320 generates an approver matrix 510 that defines the list of approvers based on a multi-segment number accounting codes that identify a business unit (e.g., division, department, project, etc.) to be billed for an order or specific line items on an order and commodity codes which identify a particular set of products or services.

In one embodiment of the present invention, the LIAP 320 is implemented to provide both requisition level approval and line item level approval. In the present invention, an approver becomes part of the approval process depending on particular line items in the requisition.

The line item approval process of the present invention provides a more defined way in which a user is added to the approval process. It also allows certain line items to be approved that may not depend on the approval of the other line items in a particular requisition. For example, in the prior art's requisition level approval process having a five line item requisition, an approver may not want to approve a requisition because of one line item out of the five.

Therefore, this "all-or-nothing" scenario of the prior art disallowed the other line items in a particular purchase requisition to be approved. In the line item approval process of the LIAP 320 of the present invention, an approver may decline one line item but yet approve other line items in the requisition which allows the purchase order to be created for the approved line items.

Figure 6:
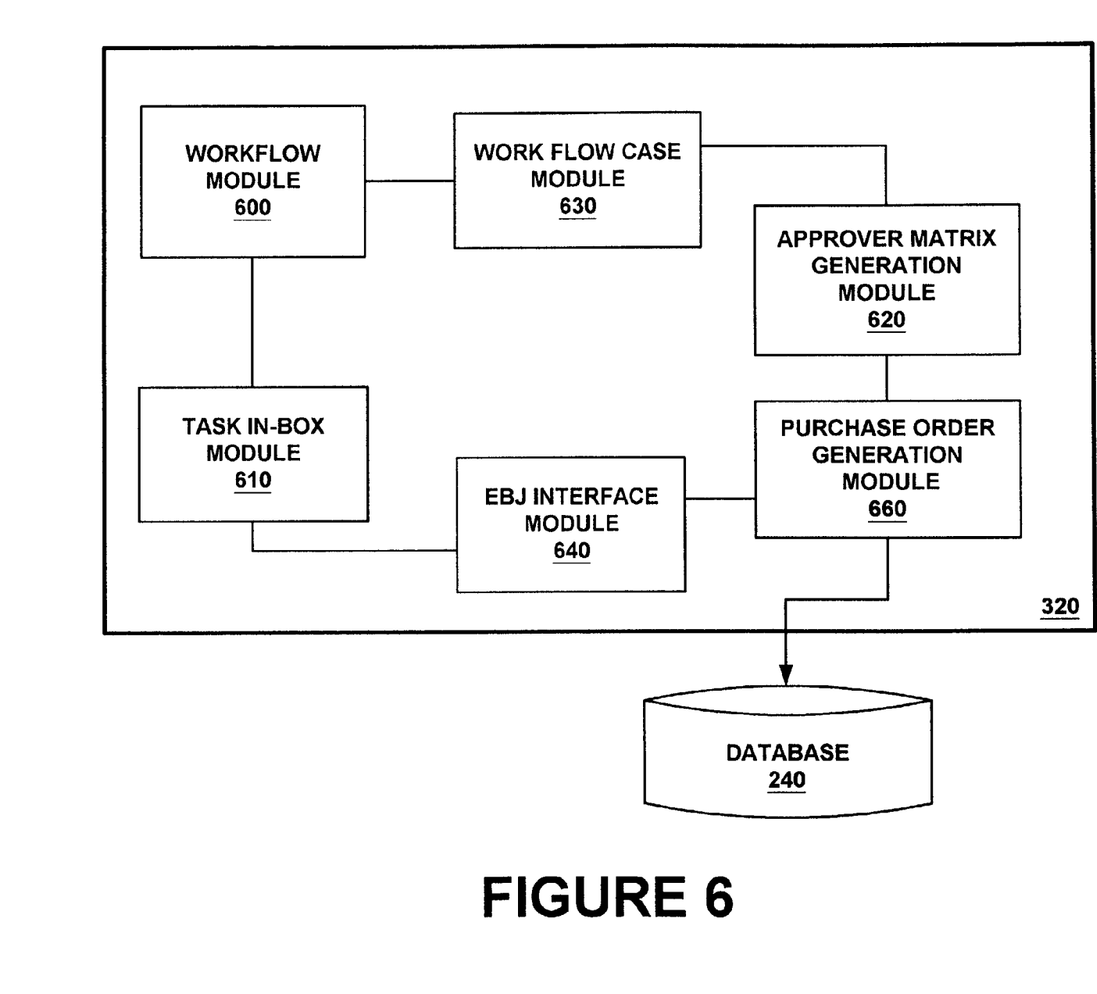
FIG. 6 is a block diagram of one embodiment of the purchasing processing system of the present invention.

Still referring to FIG. 5, the LIAP 320 generates an approver matrix 510 as part of an attribute of the LIAP 320 workflow process (FIG. 6). The approver matrix 510 is implemented as an array of approver names and approval conditions. Each row of approver matrix 510 presents an entry for one approver. Each column of the approver matrix 510 presents a single condition, such as maximum approval amount. Other than the approver's name, conditions are based primarily on commodity codes and accounting codes. The approval process definitions use the approver matrix 510 to identify the appropriate approver or approvers for each purchase request.

Additionally, the process manager 310 generates an approval graph 520. The approval graph 520 provides a matrix of identified approvers for a particular requisition. The approval graph 520 contains information about the lines to which each approver is added. In the approval graph matrix 520 shown in FIG. 5, a user can view, on a computer screen, the detailed approval information for each of the boxes (e.g., A-D) by clicking on any of the boxes.

Figure 9:
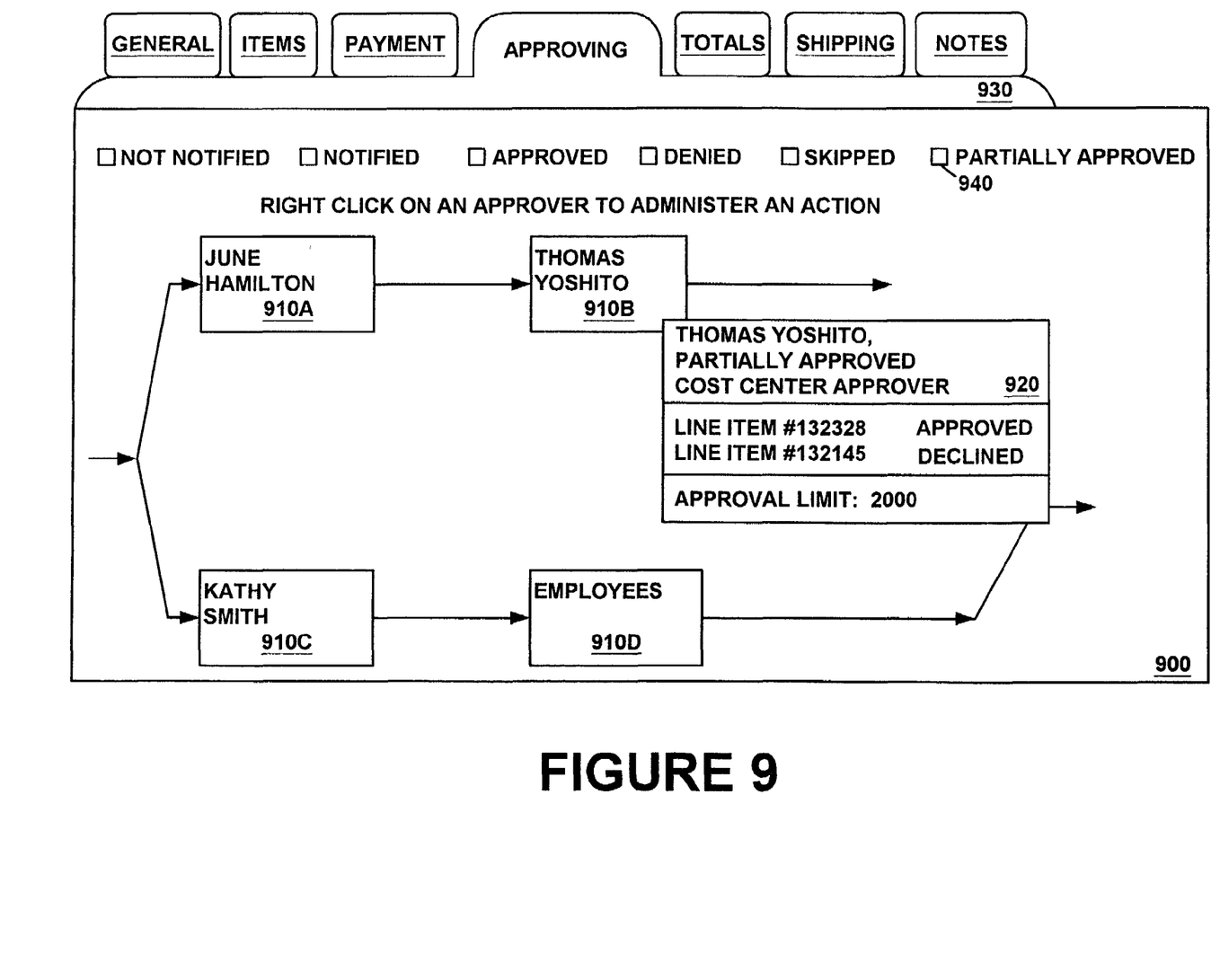
FIG. 9 is an exemplary screen display of one embodiment of the approver's in-box of the present invention.

Detailed information on the approver appears on the user's computer screen in the form of a drop down window (FIG. 9). Also, unlike the prior art approval chain, the approval graph 520 is not serially linked. Thus, once a user submits the requisition, the process manager module 310 may send an email to the first set (first in each of the parallel chains) of approvers with only relevant lines items requiring their approval. In other words, a particular approver only sees the line items that are relevant for him/her.

These approvers can approve or decline or partially approve the requisition. If there is at least one line item that is approved, the requisition is transmitted further to the next approver until the purchase order is generated. If all the line items are declined by each of the identified approvers to the requisition, then the approval process ends and the purchasing system 220 will not generate a corresponding purchase order to that particular purchase requisition.

FIG. 6 is block diagram depiction of one embodiment of the LIAP 320 of the present invention. As shown in FIG. 6, the LIAP 320 comprises workflow module 600, task in-box 610, approver matrix generation module 620, workflow case module 630, EJB interface module 640, communication interface module 650 and purchase order generation module 660.

The workflow module 600 handles the flow of the approval process of requisitions presented to the LIAP 320. The workflow module 600 coordinates the various approvals and denials that each identified approver to a line item in a particular requisition must resolve. The workflow module 600 also routes requisitions for approvals through the purchasing system 220. Furthermore, the workflow module 600 sets the rules to which each approver must adhere.

Such rules may include the escalation of a line item approval by an identified approver to a superior who may not have originally been listed as one of the approvers of the requisition. Alternatively, the rules also provide for a delegation mechanism that enables an identified approver to delegate the approval process to a subordinate who may not have also been listed as one of the original approvers.

Escalation also provides a process of assigning an approval request to another individual in the event that the currently-assigned individual, as the primary approver, fails to act upon a request within a specified period of time. The workflow module 600 also coordinates the flow of the approval process from the LIAP 320 and the process manager 310.

The workflow module 600 also provides the approver with the ability to view approval request in the approver's in-box 610 when the approver logins into their computer system. Task in-box module 610 stores the in-box information associated with each approver in the approval process. In one embodiment of the present invention, task in-box 610 populates the identified approver's in-box to generate a purchase order by accumulating the approved line items in a particular purchase requisition in purchase order generation module 660.

An approver matrix module 620 is included as an attribute of the workflow module 600. The approver matrix 620 is implemented as an array of approver names and approval conditions that the system administrator may setup. Each row of the approval matrix presents an entry for one approver. Each column presents a single condition, such as the maximum approval amount. Other than the approver's name, conditions based primarily on the commodity and accounting codes are used. Other approval conditions authorizing an approver to approve a particular line item can be added to the approval matrix 620 to further distinguish that particular approver from others in a particular requisition.

The workflow case module 630 of FIG. 6 is a unit within the workflow module 600. An approvable object has to be converted into a workflow case for the workflow module 600. The workflow case module 630 consists of one or more workflow tasks. The workflow task is a unit of work for each individual approver. The operations each approver can perform include approve, decline, reassign, delegate, etc. In addition to an approver, a workflow task is also associated with an approver.

The LIAP 320 communicates with the process manager module 310 via interface module 640 such as an Enterprise Java™ Beans interface (which is a proprietary interface of Sun Microsystems™). EJB interface module 640 takes a requisition processing request submitted to the LIAP 320 and queries the process manager module 310 on the status of requisitions, approvers, etc. Feed back information from the process manager module 310 is transmitted via the EJB interface module 640 to the LIAP 320 in response to requests to the process manager module 310. In order to achieve maximum scalability, it becomes necessary to provide an interface for the LIAP 320 to communicate with the process manager 310. The EJB interface module 640 is scalable and robust and provides a seamless integration of the process manager functionality into the LIAP 320.

Communication interface module 650 provides a communication channel between the purchasing system 220 and a communication medium, such as email, to notify an identified approver the presence of an approval request.

Figure 7:
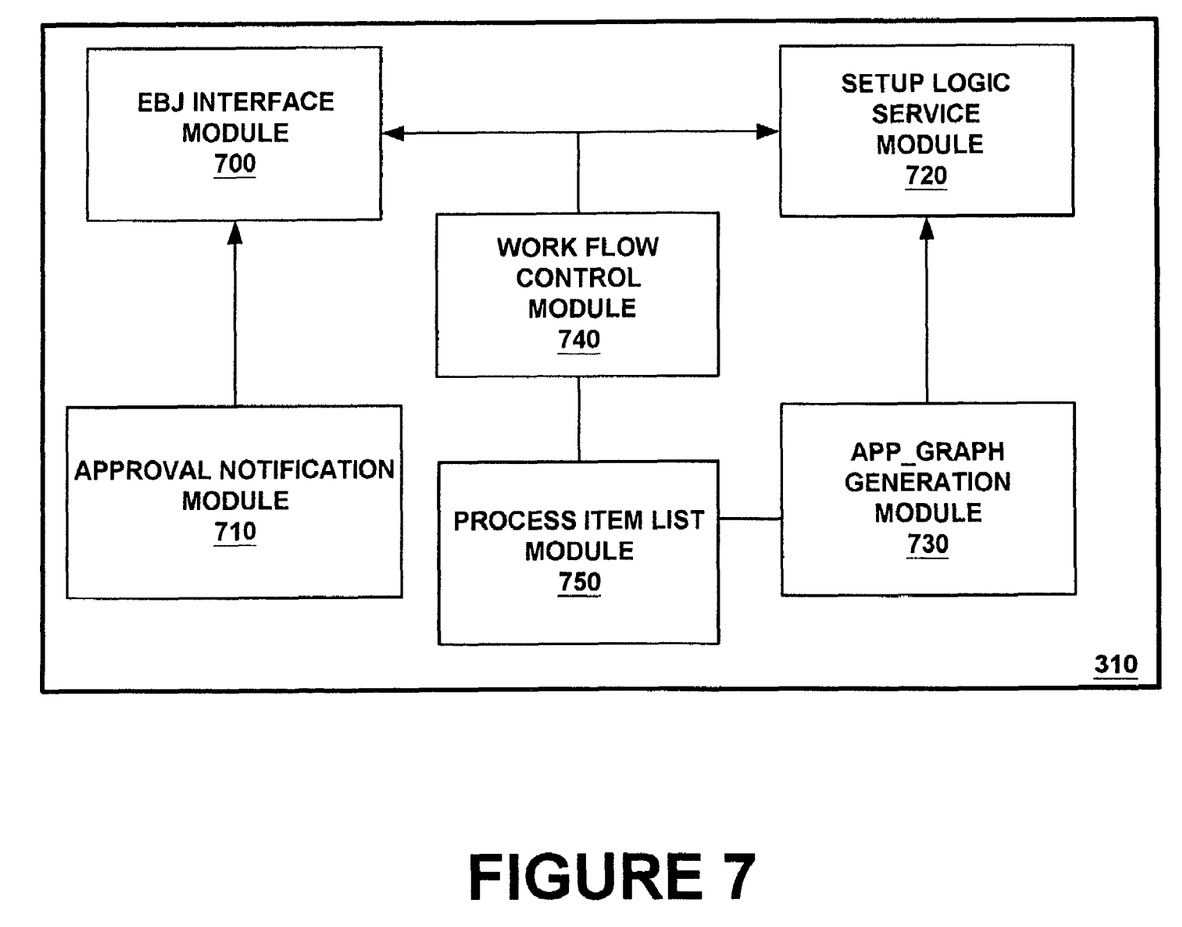
FIG. 7 is a block diagram of an embodiment of the process manager of FIG. 6 of the present invention.

FIG. 7 is a block diagram depiction of one embodiment of the internal architecture of the process manager 310 of the present invention. As shown in FIG. 7, the process manager 310 comprises EJB interface module 700, approval notification module 710, setup logic service module 720, approval graph generation module 730, workflow control module 740 and process item list 750.

EJB interface module 700 is coupled to the process manager 310 to communicate with the LIAP 320. Interface 700 performs the same functions as Interface 640 (FIG. 6).

The purchase approval tracking in the process manager module 310 is handled by the setup service module 720 which is initiated when a purchase requisition is submitted to the LIAP 320. The setup service module includes a timer that times the approval of a request by an approver. In one embodiment of the present invention, a requisitions access to the approval process is timed to be approximately 50 seconds.

Approval Graph generation module 730 generates the approval graph after a requisition has been submitted to the LIAP 320. The approval graph module 730 provides the services to modify the approval process from the buyer side. All modifications to the approval graph are communicated to the process manager module 310 by a system administrator of the e-purchasing system.

Workflow through the process manager module 310 is controlled by workflow control module 740. The workflow control module 740 tracks each line item approver corresponding to each requisition to determine when the approver has acted on a given line item. As line items are approved or declined, the workflow control logic 740 tracks and notifies other approvers in the approval chain via approval notification module 710 regarding the status of a pending requisition.

Figure 8:
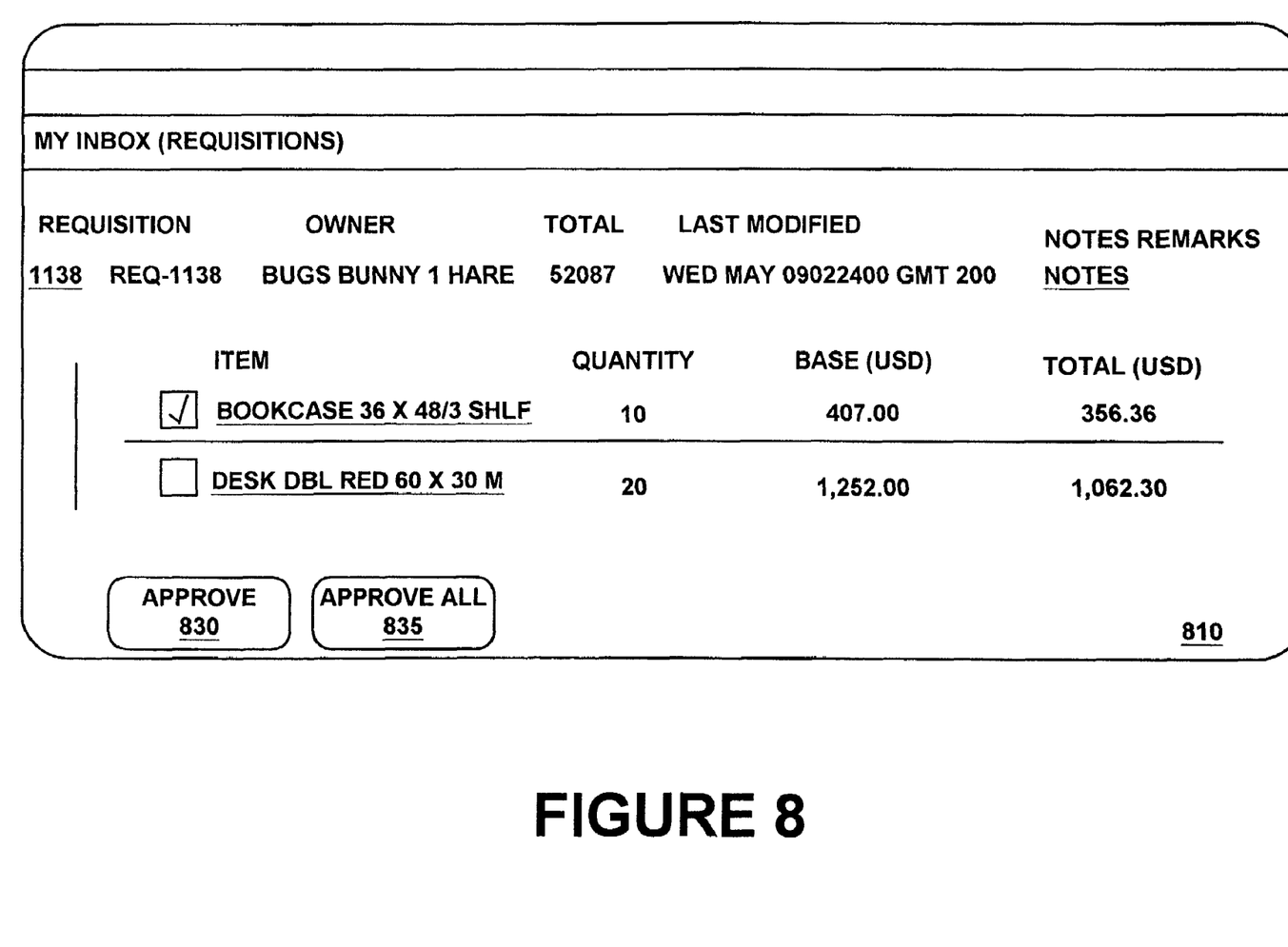
FIG. 8 is an exemplary screen display of one embodiment of the approver's graph of the present invention.

Process item list 750 provides a list of active processes in the process manager module 310. A user of the e-purchasing system 220 may access the process item list 750 by accessing the process manager screen (FIG. 8). The user will see the requisitions that the user submitted from the LIAP 320. The user may select the process and it will display a form with the name of the approver that is currently assigned to the requisition details and the buttons for approving or declining.

If the user chooses to approve the requisition, the requisition is assigned to a second approver and it will appear in the process item list 750. Once the user acts on the requisition as a second approver, the requisition will be removed from the process item list 750, as there will be no more approvals. However, if there is a line item decline, the requisition initially will be available to the user in the process item list 750 because it does not require any more approvals.

FIG. 8 is an exemplary screen display 800 of one embodiment of the user in-box 810 of the present invention. The approval monitor window 810 illustrates all line item information that the approver will need to either approve or deny a requisition.

As depicted in FIG. 8, the user in-box 810 comprises a listing of the requisition number, the owner of the requisition and the quantity and pricing information of the items being requisitioned. The approval in-box 810 also includes an approve selector 830 and an approve-all 835 selector to enable the requisition approve to either partially approve line items in a particular requisition or all the lines items presented in the particular requisition. To approve the set of line items in the user in-box 810 (e.g., BOOKCASE.36X48, 3SHLF . . . , DESK.DBL.PED.60X30 M, etc.) the approver partially approves each individual line item by clicking on the identified line item and check marking the selection and then clicks on the approve button 830 to approve the particular selection. Alternatively, the user may click on the approve all 835 button to approve the items presented in the approver's in-box 810.

FIG. 9 is an exemplary screen display 900 of one embodiment of the process manager screen showing the approval graph of the present invention. The approval process monitor window 900 illustrates details of line item information for each approver.

As depicted in FIG. 9, the approval process monitor window 900 comprises a matrix of all the approvers for a particular requisition. A user can click on one of boxes 910A-910D to check on the details of each approver in the matrix. When a user clicks on the box with the corresponding name of the approver, a drop-down window 920 appears with the approval details of the approver. The detail information shown in drop-down window 920 may include the approver's full name, the type of approver (e.g., cost center approver), the line items that the approver has either approved or declined and the approver's authorized maximum dollar approval amount.

Still referring to FIG. 9, the user may click on different tab options in window to view additional information regarding a particular requisition. Once the user has viewed and decided on the desired tab, the user may select the desired tabs by choosing from tabs 930. For example, clicking on the tab labeled "shipping" will give the user detailed shipping information about items listed in a purchasing requisition.

Figure 10:
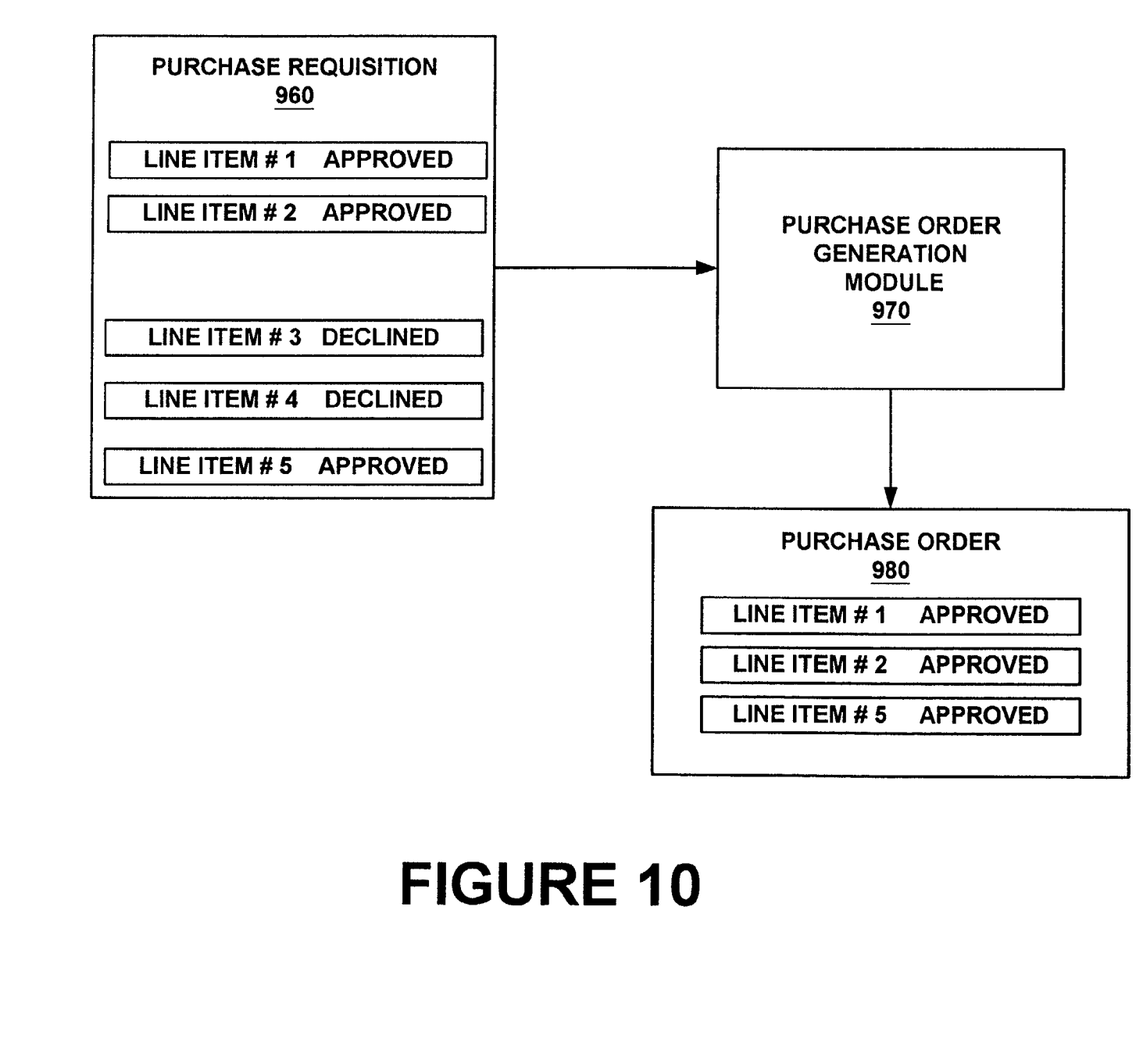
FIG. 10 is an exemplary block flow diagram of one embodiment of the purchase order generation process of the present invention.

FIG. 10 is a data flow diagram of one embodiment of the line item approval system 320 of the present invention. As shown in FIG. 10, identified line items of a specific purchase requisition 960 are selected after those line items have been approved by the appropriate authorized approvers. The approved line items of the selected line items are then cumulatively presented to a purchase order generation module 970.

The purchase order generation module 970 subsequently generates a corresponding purchase order itemizing the line items approved during the approval process. In one embodiment of the present invention, those line items that are declined in the purchase requisition 960 may be cumulatively bundled in a dummy file that is accessible by the identified approvers for a corresponding purchase requisition.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

The invention claimed is:

1. An electronic purchasing system, comprising:
   a process manager system configured to automatically process electronic purchase requisitions over multiple back-end resource servers, wherein the process manager system is configured to access a plurality of catalogs containing descriptions of goods and services pertinent to a procurement environment;
   a database configured to store data descriptors describing items contained in said catalogs, and configured to store data object and attributes pertinent to said electronic purchase requisitions; and
   a line item approving system configured to, responsive to receiving a particular purchase requisition associated with a particular purchasing request, process approval of a plurality of items specified in said particular purchase requisition on a line-by-line basis, wherein one or more approvers are identified for each of the plurality of items, wherein to process approval the line item approving system is further configured to present to a particular approver only those items for which the particular approver is identified, and wherein the items for which the particular approver is identified are less than all of the plurality of items specified in said particular purchase requisition.

2. The electronic purchasing system of claim 1, wherein the process manager system is configured to generate an approval graph of identified approvers of the plurality of items specified in said particular purchase requisition, and wherein for each identified approver said approval graph indicates the items for which the approver is identified.

3. The electronic purchasing system of claim 2, further comprising an automatic notification service configured to automatically detect a line item approval in said particular purchase requisition and notify approvers in said approval graph only if they are identified approvers of an item approved by said line item approval.

4. The electronic purchasing system of claim 3, wherein said automatic notification service is an electronic mail service.

5. The electronic purchasing system of claim 1, wherein said line item approving system comprises an approval matrix configured to associate an identified approver with each line item and conditions related to approval authority in said particular purchase requisition.

6. The electronic purchasing system of claim 1, wherein said line item approving system comprises a workflow module configured to coordinate said approval process between approvers identified for said particular purchase requisition.

7. The electronic purchasing system of claim 6, wherein said line item approving system further comprises a workflow case module configured to store a plurality of workflow tasks defining a unit of work for each identified approver in said particular purchase requisition.

8. The electronic purchasing system of claim 7, wherein said workflow tasks further define operations that each of said identified approvers perform in relation to said particular purchase requisition.

9. The electronic purchasing system of claim 8, wherein said operations comprise approving a particular line item in said particular purchase requisition.

10. The electronic purchasing system of claim 9, wherein said operations further comprise declining said particular line item in said particular purchase requisition.

11. The electronic purchasing system of claim 10, wherein said operations further comprise reassigning approval of said particular line item in said particular purchase requisition.

12. The electronic purchasing system of claim 11, wherein said operations further comprises delegating approval of said particular line item in said particular purchase requisition.

13. The electronic purchasing system of claim 2, wherein said process manager system comprises a workflow control module configured to monitor and track approvals by identified approvers specified in a purchase requisition.

14. The electronic purchasing system of claim 13, wherein said process manager system further comprises an approval graph generator configured to generate a matrix of identified approvers for purchase requisitions submitted to the electronic purchase system.

15. An electronic purchasing approval system, comprising:
   a line item approval module configured to, in response to receiving a particular purchasing requisition associated with a particular purchasing request, process approval of a plurality of items specified in said particular purchasing requisition on a line-by-line basis, wherein one or more approvers are identified for each of the plurality of items, wherein to process approval the line item approval module is further configured to present to a particular approver only those items for which the particular approver is identified, wherein the items for which the particular approver is identified are less than all of the plurality of items specified in said particular purchasing requisition; and
   a process manager configured to manage the approval process in said line item approval module.

16. The electronic purchasing approval system of claim 15, wherein said process manager comprises a graph generator configured to generate an approval graph of identified approvers of the plurality of items specified in said particular purchasing requisition, and wherein for each identified approver said approval graph indicates the items for which the approver is identified.

17. The electronic purchasing approval system of claim 16, wherein said process manager further comprises an automatic notification service configured to automatically detect a line item approval in said particular purchasing requisition and notify approvers in said approval graph only if they are identified approvers of an item approved by said line item approval.

18. The electronic purchasing approval system of claim 17, wherein said notification service is an electronic mail service.

19. The electronic purchasing approval system of claim 15, wherein said line item approval module comprises an approval matrix configured to associate an identified approver with each line item and conditions related to said approver's approval authority in said particular purchasing requisition.

20. The electronic purchasing approval system of claim 15, wherein said line item approval module comprises a workflow module configured to coordinate said approval process between approvers identified for said particular purchasing requisition.

21. The electronic purchasing approval system of claim 15, wherein said line item approval module further comprises a workflow case module configured to store a plurality of workflow tasks defining a unit of work for each identified approver in said particular purchasing requisition, and wherein said workflow tasks further define operations that each of said identified approvers may perform in relation to said particular purchasing requisition.

22. The electronic purchasing approval system of claim 21, wherein said operations that each of said identified approvers may perform in relation to said particular purchasing requisition comprise:
   approving said particular line item in said particular purchasing requisition; and
   declining said particular line item in said particular purchasing requisition.

23. The electronic purchasing approval system of claim 22, wherein in response to an identified approver declining said particular line item in said particular purchasing requisition, the line item approval module is configured to generate a dummy file comprising one or more declined line items.

24. The electronic purchasing approval system of claim 22, wherein said operations further comprise reassigning approval of said particular line item in said particular purchasing requisition.

25. The electronic purchasing approval system of claim 22, wherein said operations further comprise delegating approval of said particular line item in said particular purchasing requisition.

26. The electronic purchasing approval system of claim 15, wherein said process manager comprises a workflow control module configured to monitor and track approvals by identified approvers specified in a purchasing requisition.

27. The electronic purchasing system of claim 16, wherein for each identified approver, said approval graph includes an indication of the approver's actions regarding approval of each item for which the approver is identified.

28. A line item approval method in an electronic purchasing system, comprising:
   receiving a purchase request cataloged in a plurality of documents by said electronic purchasing system, said purchasing request comprising goods, services and supplied information defining purchasing parameters specific and unique to a particular purchasing professional;
   generating an approval matrix defining a list of a plurality of approvers responsible for approving line items in said purchase request, wherein each line item is associated with a respective approver;
   distributing said purchase request to said plurality of approvers to approve said line items in said purchase request associated with each of said identified approvers on a line-by-line basis, said distributing comprises presenting to a particular approver only those line items for which the particular approver is identified, and wherein the items for which the particular approver is identified are less than all of the plurality of items specified in said particular purchasing request, wherein each approver approvers only their associated line items; and
   generating a purchase order in response to said purchase request, said purchase order being generated based on line items approved by said plurality of approvers.

29. The method of claim 28, wherein said approval matrix provides a list of approval conditions associated with each one of said plurality of approvers.

30. The method of claim 28, wherein said purchase order is generated irrespective of a non-approval of a line item in said purchase request by one of said plurality of identified approvers.

31. The method of claim 30, wherein said line item by line item approval comprises providing a requisition in-box for notifying each of said approvers when a line item in said purchase request requires their approval.

* * * * *